United States Patent
Wensley et al.

(10) Patent No.: US 11,027,681 B2
(45) Date of Patent: Jun. 8, 2021

(54) IN-VEHICLE SYSTEM FOR COMPARING A STATE OF A VEHICLE CABIN BEFORE AND AFTER A RIDE

(71) Applicant: Robert Bosch GmbH, Stuttgart (DE)

(72) Inventors: Paul R. Wensley, Half Moon Bay, CA (US); Dietmar Meister, Cupertino, CA (US)

(73) Assignee: Robert Bosch GmbH, Stuttgart (DE)

(*) Notice: Subject to any disclaimer, the term of this patent is extended or adjusted under 35 U.S.C. 154(b) by 357 days.

(21) Appl. No.: 16/232,608

(22) Filed: Dec. 26, 2018

(65) Prior Publication Data

US 2020/0207298 A1 Jul. 2, 2020

(51) Int. Cl.
*B60R 16/03* (2006.01)
*B60S 5/00* (2006.01)
*B60R 16/037* (2006.01)

(52) U.S. Cl.
CPC .............. *B60R 16/037* (2013.01); *B60S 5/00* (2013.01)

(58) Field of Classification Search
CPC ........ B60R 16/037; B60R 16/027; B60S 5/00
See application file for complete search history.

(56) References Cited

U.S. PATENT DOCUMENTS

| 5,682,134 A | 10/1997 | Stallbohm |
| 5,798,458 A | 8/1998 | Monroe |
| 6,026,340 A | 2/2000 | Corrado et al. |
| 6,801,662 B1 | 10/2004 | Owechko et al. |
| 8,988,220 B2 * | 3/2015 | Markyvech ......... B60R 25/1004 340/541 |

(Continued)

FOREIGN PATENT DOCUMENTS

| CN | 204902891 U | 12/2015 |
| EP | 1013518 A2 | 6/2000 |

(Continued)

OTHER PUBLICATIONS

Buhr, S., "The Caruma Aims to be a Fitbit for Cars," TechCrunch, 2015, retrieved from Internet Dec. 26, 2018: https://techcrunch.com/2015/12/07/the-caruma-aims-to-be-a-fitbit-for-cars/ (2 pages).

(Continued)

*Primary Examiner* — Tan Q Nguyen
(74) *Attorney, Agent, or Firm* — Maginot, Moore & Beck LLP (57) ABSTRACT

An in-vehicle system and method are disclosed for identifying changes in the scene inside the cabin of the vehicle before and after usage thereof. The in-vehicle system includes a plurality of sensors that measure, capture, and/or receive data relating to attributes the interior of the cabin. The in-vehicle system includes a scene estimator that determines and/or estimates one or more attributes of the interior of the cabin based on individual sensor signals received from the sensors. The scene estimator determines additional attributes based on combinations of one or more of the attributes determined based on the sensor signals individually. The attributes determined by the scene estimator collectively comprise an estimation of the scene inside the cabin of the vehicle. The scene estimator determines changes in the scene inside the cabin based on changes in the scene estimation before and after usage thereof.

20 Claims, 5 Drawing Sheets

(56) References Cited

U.S. PATENT DOCUMENTS

| | | |
|---|---|---|
| 9,475,496 B2 | 10/2016 | Attard et al. |
| 9,688,271 B2 | 6/2017 | Chan et al. |
| 10,051,060 B2 | 8/2018 | Basu et al. |
| 2006/0271261 A1 | 11/2006 | Flores et al. |
| 2008/0202862 A1 | 8/2008 | Dudde et al. |
| 2009/0268947 A1* | 10/2009 | Schaufler ............ G06K 9/00805 382/104 |
| 2013/0338857 A1 | 12/2013 | Sampigethaya |
| 2014/0306799 A1 | 10/2014 | Ricci |
| 2015/0321768 A1 | 11/2015 | Kumar et al. |
| 2016/0096412 A1 | 4/2016 | Mankame et al. |
| 2017/0080900 A1 | 3/2017 | Huennekens et al. |
| 2017/0163734 A1 | 6/2017 | Basu et al. |
| 2017/0232975 A1* | 8/2017 | Burk .................... B60W 50/16 701/48 |
| 2019/0146494 A1* | 5/2019 | Li ......................... B62D 63/02 701/23 |

FOREIGN PATENT DOCUMENTS

| | | |
|---|---|---|
| EP | 1834850 B1 | 10/2011 |
| JP | H10147213 A | 6/1998 |
| JP | 2010149767 A | 7/2010 |

OTHER PUBLICATIONS

GoGPS, Nauto, retrieved from internet Dec. 26, 2018: https://gogps.com/nauto (7 pages).

Etherington, D., "Vayyar launches 3D sensors that give self-driving cars interior awareness," TechCrunch, 2017, retrieved from Internet Dec. 26, 2018: https://techcrunch.com/2017/07/13/vayyarlaunches-3d-sensors-that-give-self-driving-cars-interior-awareness/ (1 page).

Elarm, 2013, retrieved from Internet Dec. 26, 2018: https://www.crunchbase.com/organization/elarm#section-overview (2 pages).

Minut, retrieved from Internet Dec. 26, 2018: https://minut.com/ (7 pages).

* cited by examiner

|  | VOC Attribute From Second Sensor | |
|---|---|---|
| Air Quality Attribute | < 500ppb | > 500ppb |
| < 24 degrees | Dirty | Dirty |
| > 24 degrees | Clean | Clean |

Temperature Attribute From First Sensor

IN-VEHICLE SYSTEM FOR COMPARING A STATE OF A VEHICLE CABIN BEFORE AND AFTER A RIDE

FIELD

This disclosure relates generally to vehicle cabin systems and, more particularly, to a system and method for comparing a state of a vehicle cabin before and after a ride.

BACKGROUND

Unless otherwise indicated herein, the materials described in this section are not prior art to the claims in this application and are not admitted to the prior art by inclusion in this section.

As the technologies move towards autonomous driving, new business models with new sets of challenges are going to develop. Particularly, self-driving taxis, shuttles, and freight transportation vehicles may be one of the first applications for fully autonomously driving cars. While self-driving vehicles will offer cost savings and possibilities for added efficiency that can be passed onto the user or customer in the form of lower prices, increased flexibility, and increased availability, the lack of a human driver presents a new set of challenges. Particularly, without a human driver, the car itself may need to take on the task of understanding the state of the car interior, which may include identifying left-behind objects (e.g. cell phones, bags, umbrellas, etc.), identifying if and when cleaning or other maintenance is needed, or identifying an emergency situation in which emergency services (e.g., police or ambulance) need to be called. Therefore, it is desirable or even necessary for an autonomous vehicle to have a system in the vehicle that can intelligently sense the vehicle interior to detect certain events of interest.

Many attempts have been made for driver and passenger monitoring (e.g., face tracking, eye tracking and gesture recognition). However, less attention has been paid to sensing of the interior environment within the vehicle. Consequently, improvements to systems and methods for in-vehicle would be beneficial.

SUMMARY

A system for monitoring a scene in an interior of a cabin of a vehicle is disclosed. The system comprises a plurality of sensors, each sensor in the plurality of sensors configured to output a respective sensor signal, at least one sensor in the plurality of sensors being configured measure an aspect of the interior of the cabin; and a processing system operably connected to the plurality of sensors and having at least one processor. The processing system is configured to: receive each respective sensor signal from the plurality of sensors; determine, during a first time period, (i) a reference value for a first attribute of the interior of the cabin based on a first sensor signal from a first sensor in the plurality of sensors, (ii) a reference value for a second attribute of the interior of the cabin based on a second sensor signal from a second sensor in the plurality of sensors, and (iii) a reference value for a third attribute of the interior of the cabin based on the reference value for the first attribute and the reference value for the second attribute; determine, during a second time period that is subsequent to the first time period, (i) a current value for the first attribute of the interior of the cabin based on the first sensor signal from the first sensor in the plurality of sensors, (ii) a current value for the second attribute of the interior of the cabin based on the second sensor signal from the second sensor in the plurality of sensors, and (iii) a current value for the third attribute of the interior of the cabin based on the current value for the first attribute and the current value for the second attribute; and determine a change in the interior of the cabin by comparing the current value for the third attribute with the reference value for the third attribute.

A method for monitoring a scene in an interior of a cabin of a vehicle is disclosed. The method comprises receiving, with a processing system, a respective sensor signal from each of a plurality of sensors, the processing system being operably connected to the plurality of sensors and having at least one processor, each sensor in the plurality of sensors being configured to output the respective sensor signal to the processing system, at least one sensor in the plurality of sensors being configured measure an aspect of the interior of the cabin; determining, with the processing system, during a first time period, (i) a reference value for a first attribute of the interior of the cabin based on a first sensor signal from a first sensor in the plurality of sensors, (ii) a reference value for a second attribute of the interior of the cabin based on a second sensor signal from a second sensor in the plurality of sensors, and (iii) a reference value for a third attribute of the interior of the cabin based on the reference value for the first attribute and the reference value for the second attribute; determining, with the processing system, during a second time period that is subsequent to the first time period, (i) a current value for the first attribute of the interior of the cabin based on the first sensor signal from the first sensor in the plurality of sensors, (ii) a current value for the second attribute of the interior of the cabin based on the second sensor signal from the second sensor in the plurality of sensors, and (iii) a current value for the third attribute of the interior of the cabin based on the current value for the first attribute and the current value for the second attribute; and determining, with the processing system, a change in the interior of the cabin by comparing the current value for the third attribute with the reference value for the third attribute.

BRIEF DESCRIPTION OF THE DRAWINGS

The foregoing aspects and other features of the system and method are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

In-Vehicle System Overview

Figure 1:
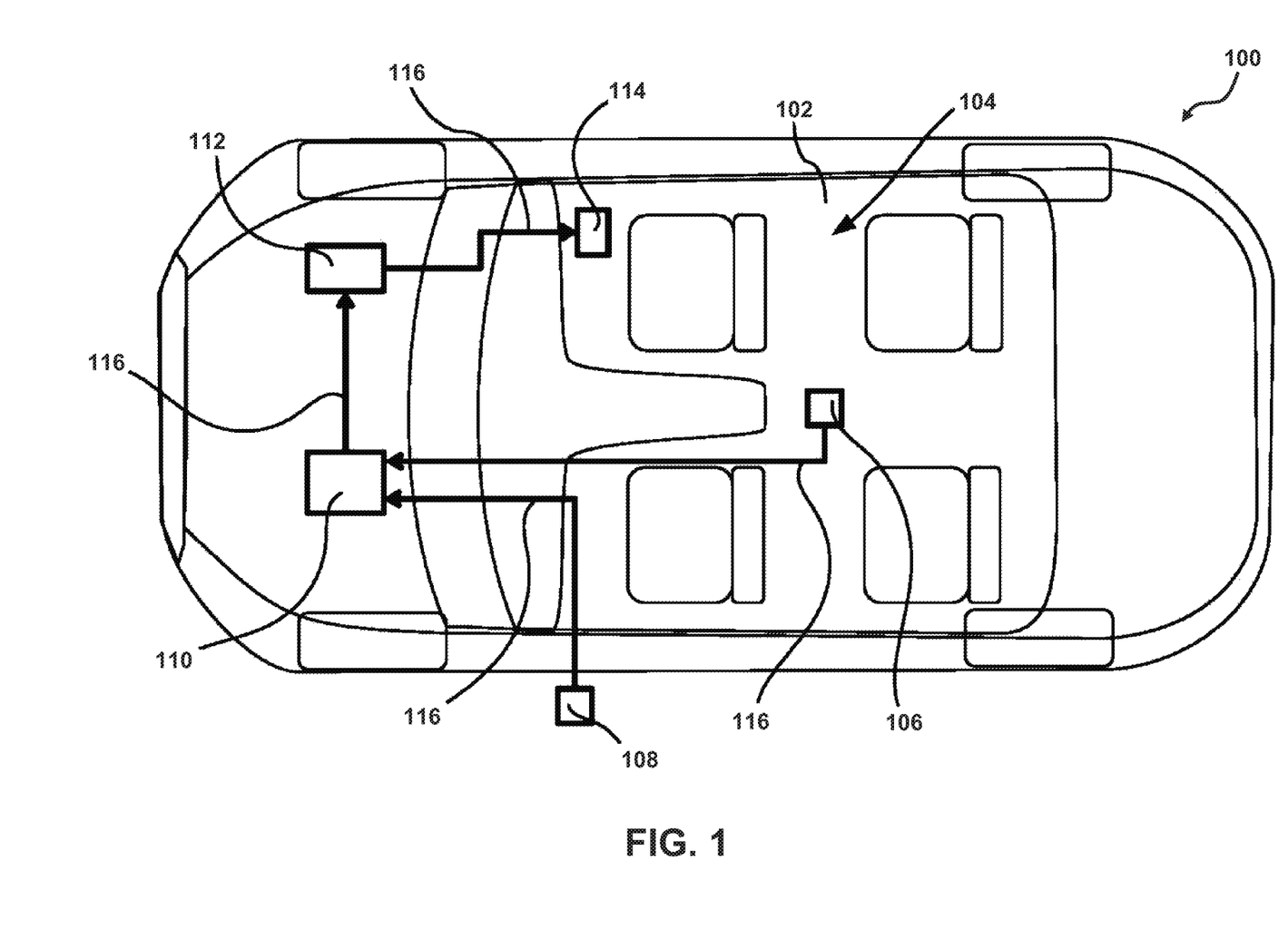
FIG. 1 shows a simplified block diagram of a vehicle having a cabin and an in-vehicle system for monitoring the cabin.

FIG. 1 shows a simplified block diagram of a vehicle 100 having a cabin 102 and an in-vehicle system 104 for monitoring the cabin 102. Although the vehicle 100 is illustrated herein as automobile, the vehicle 100 may similarly comprise any number of types of vessels having a cabin 102 for moving people or cargo, such as trains, buses, subways, aircrafts, helicopters, passenger drones, submarines, elevators, passenger moving pods. The cabin 102 (which may also be referred to herein as a compartment) is a typically closed room for accommodating passengers or cargo. Although the vehicle 100 is illustrated as having a single cabin 102, the vehicle 100 may include any number of individual and separate cabins 102 (e.g., multiple compartments or rooms inside a train car).

The in-vehicle system 104 is configured to monitor and/or estimate a state or scene inside the cabin 102 of the vehicle 100 by comparison with a reference state or scene inside the cabin 102. The in-vehicle system 104 comprises a sensing assembly having one or more sensors 106, 108, a scene estimator 110, a virtual assistant 112, and an actuator 114. The sensors 106, 108, a scene estimator 110, a virtual assistant 112, and an actuator 114 are communicatively coupled to one another via a plurality of communication buses 116, which may be wireless or wired.

The sensor(s) 106, 108 are configured to measure, capture, and/or receive data relating to attributes the interior of the cabin 102, including any passenger in the cabin 102 or objects brought into the cabin 102. In the illustrated embodiment, two sensors 106, 108 are illustrated. However, any number of sensors 106, 108 can be included in the system 104 for estimating the state of the interior of the cabin 102. As used herein, the term "attribute" refers to a state, characteristic, parameter, aspect, and/or quality. Exemplary sensors 106, 108 may include a video camera, an acoustic transducer such as a microphone or a speaker, an air quality sensor, a 3D object camera, a radar sensor, a vibration sensor, a moisture sensor, a combination thereof, or any suitable sensors. In some embodiments, the sensors 106, 108 themselves are not necessarily arranged inside the cabin 102, but are nevertheless configured to measure, capture, and/or receive data relating to attributes the interior of the cabin 102 (e.g., a radar sensor arranged outside the compartment might provide information about the interior of the compartment). In at least one embodiment, in the case of multiple cabins 102 in the vehicle 100, the sensors of the in-vehicle system 104 includes a corresponding set of sensors 106, 108 for each individual cabin 102.

The scene estimator 110 is communicatively coupled to the sensors 106, 108 via the communication buses 116. The scene estimator 110 comprises at least one processor and/or controller operably connected to an associated memory. It will be recognized by those of ordinary skill in the art that a "controller" or "processor" includes any hardware system, hardware mechanism or hardware component that processes data, signals, or other information. The at least one processor and/or controller of the scene estimator 110 is configured to execute program instructions stored on the associated memory thereof to manipulate data or to operate one or more components in the in-vehicle system 104 or of the vehicle 100 to perform the recited task or function.

The scene estimator 110 is configured to receive sensor signals from each of the sensors 106, 108. The sensor signals received from the sensors 106, 108 may be analog or digital signals. As will be described in greater detail elsewhere herein, the scene estimator 110 is configured to determine and/or estimate one or more attributes of the interior of the cabin 102 based on the received sensor signals, individually, and based on combinations of the received sensor signals. Particularly, in at least one embodiment, the scene estimator 110 is configured to determine one or more attributes of the interior of the cabin 102 based on each individual sensor signal received from the multiple sensors 106, 108. Next, the scene estimator 110 is configured to determine one or more additional attributes of the interior of the cabin 102 based on a combination of the attributes that were determined based on the sensor signals individually. These additional attributes of the interior of the cabin 102 determined based on a combination of sensor signals received from the multiple sensors 106, 108 can be seen as one or more complex "virtual" sensors for the interior of the cabin 102, which may provide indications of more complex or more abstract attributes of the interior of the cabin 102 that are not directly measured or measurable with an individual conventional sensor.

Exemplary attributes of the interior of the cabin 102 which are determined and/or estimated may include attributes relating to a condition of the interior of the cabin 102, such as air quality, the presence of stains, scratches, odors, smoke, or fire, and a detected cut or breakage of any vehicle fixtures such as seats, dashboard, and the like. Further exemplary attributes of the interior of the cabin 102 which are determined and/or estimated may include attributes relating to an object that is either left behind in the cabin 102 by a passenger or brought into the cabin 102 by the passenger that does not otherwise belong in or form a part of the interior of the cabin 102, such as a box, a bag, a personal belonging, a child seat, or so forth.

In at least one embodiment, the scene estimator is configured to, during a reference time period, capture reference signals for the sensors 106, 108 and/or determine reference values for at least some of the attributes determined by the scene estimator. The reference signals and/or reference values for the determined attributes may be captured once (e.g., after the system 104 is installed), periodically, and/or before each passenger and/or set of cargo enters the cabin 102. The scene estimator 110 is configured to store the reference signals and/or reference values for the determined attributes in an associated memory. In some embodiments, the scene estimator 110 is configured to use to reference signals in the determination of the attributes of the interior of the cabin 102. Particularly, in some embodiments, the scene estimator 110 is configured to account for changes in the condition of the cabin 102 between time of reference data capture and time of current status estimation to provide a more accurate determination of the current attributes of the interior of the cabin. For example, the scene estimator 110 may use reference signals to account for and/or compensate for changes in outside lighting conditions (e.g. intensity or direction of sun light or any other external light source) and/or changes in outside air condition The attributes determined by the scene estimator 110 collectively represent an estimation of the scene inside the interior of the cabin 102. In at least one embodiment, the scene estimator 110 is configured to, during a reference time period, determine reference values for each of the attributes that comprise the estimation of the scene inside the interior of the cabin 102, to provide a reference scene estimation A. In one embodiment, the references scene estimation A is determined while the cabin 102 is empty (i.e., the cabin 102 contains no passengers or cargo). In one embodiment, the references scene estimation A is determined while the cabin 102 is known to be clean (e.g., after a cleaning of the cabin 102). The reference scene estimation A may be captured once (e.g., after the system 104 is installed), periodically, and/or before each passenger and/or set of cargo enters the cabin 102. For example, in the case that the vehicle is utilized for an autonomous taxi service or the like, the scene estimator 110 may be configured to capture the reference scene estimation A every morning at the taxi depot and/or before each passenger enters the vehicle 100. In some embodiments, multiple references scene estimations may be captured. For example, the scene estimator 110 may be configured to capture a reference scene estimation $A_1$ after the system 104 is installed, capture a reference scene estimation $A_2$ every morning at the taxi depot, and capture a reference scene estimation $A_3$ before each passenger enters the vehicle 100.

The scene estimator 110 is configured to store the reference scene estimation(s) A in an associated memory for comparison with later determined scene estimations. Particularly, the scene estimator 110 is configured to, during a subsequent time period, determine new values for each of the attributes that comprise the estimation of the scene inside the interior of the cabin 102, to provide a scene estimation B. For example, in the case that the vehicle is utilized for an autonomous taxi service or the like, the scene estimator may be configured to capture the scene estimation B every night when the vehicle returns to the taxi depot and/or after each passenger exits the vehicle 100.

The scene estimator 110 is configured to compare the values of the reference scene estimation(s) A with the values of the scene estimation B to determine changes in one or more attributes of the interior of the cabin 102. For example, based on the comparison, the scene estimator 110 may determine that an item has been left in the cabin 102 by a passenger or that a seat in the cabin has a stain on it. The scene estimator 110 is configured output to the virtual assistant 112 a signal or message indicating the changes in the scene of the interior of the cabin 102. In some embodiments, in response to detecting a particular change in an attribute of the interior of the cabin 102, the scene estimator 110 and/or the virtual assistant 112 is configured trigger one or more ameliorative actions, such as scheduling a cleaning of the vehicle or notifying a passenger of a forgotten item. In some embodiments, scene estimator 110 is configured to ignore certain types of changes in the scene of the interior of the cabin 102 as not being relevant for the output of scene estimator 110. For example, scene estimator 110 may be configured to ignore a changed position of a seat belt, a changed position or orientation of a seat or neck rest, a changed position of a control element (e.g. steering wheel or door handle), or a changed position of objects belonging to the cabin 102 (e.g. floor mats).

The virtual assistant 112 is communicatively coupled to the scene estimator 110 via the communication buses 116. The virtual assistant 112 comprises at least one processor and/or controller operably connected to an associated memory. It will be recognized by those of ordinary skill in the art that a "controller" or "processor" includes any hardware system, hardware mechanism or hardware component that processes data, signals, or other information. The at least one processor and/or controller of the virtual assistant 112 is configured to execute program instructions stored on the associated memory thereof to manipulate data or to operate one or more components in the in-vehicle system 104 or of the vehicle 100 to perform the recited task or function.

The virtual assistant 112 is at least configured to receive the signal or message indicating the changes in changes in the scene of the interior of the cabin 102 from the scene estimator 110. In at least one embodiment, the virtual assistant 112 is configured to triggers one or more actions based on the signal or message indicating the changes in changes in the scene of the interior of the cabin 102. Particularly, in many embodiments, the scene estimator 110 does not directly trigger any actions based on the attributes of the interior of the cabin 102 and only provides the scene estimation information to the virtual assistant 112, which is responsible for taking action based on the scene estimation information, when necessary or desired.

In at least one embodiment, the virtual assistant 112 is communicatively coupled to one or more actuators 114 of the vehicle 100, which can be activated to perform various actions or operations. These actions might be applied to the interior of the cabin 102 or to other systems outside the cabin 102. In some embodiments, the virtual assistant 112 may be communicatively coupled to any suitable modules other than the actuators 114 to cause the modules to activate and perform one or more actions.

Additionally, in some embodiments, the scene estimator 110 is also communicatively coupled to the one or more actuators 114 of the vehicle 100. In some embodiments, the scene estimator 110 is configured to operate the actuators 114 to influence the attributes of the scene of the interior of the cabin 102 for the purpose of improving the accuracy and reliability of the scene estimations. At least some of the actuators are configured to adjust an aspect of the interior of the cabin that influences at least one of the first sensor signal and the second sensor signal. The scene estimator 110 is configured set one or more actuators 114 to a predetermined state before and/or during time periods in which the reference scene estimation(s) A and/or the scene estimation B are determined. For example, the scene estimator 110 may be configured to operate lights to illuminate the cabin 102 or specific elements within it, operate blinds to exclude exterior light from the cabin, operate a ventilation system to exchange or clean the air within the cabin, operate an engine and/or steering wheel to position the vehicle 100 in a particular manner, operate an engine and/or steering wheel to move the vehicle 100 slightly to identify lighting artifacts, operate a seat motor to put the seat to a predetermined standard position, operate speakers to create a specific reference or test noise, and/or operate a display to show a test picture. By operating one or more actuators 114 to in a predetermined state, the quality of the scene estimation may be improved.

Although the in-vehicle system 104 as illustrated is a stand-alone system, in some embodiments, portions of or all of the functionality of the scene estimator 110 and the virtual assistant 112 may be implemented by a remote cloud computing device which is in communication with the in-vehicle system 104 via an Internet, wherein shared resources, software, and information are provided to the in-vehicle system 104 on demand.

Scene Estimator

Figure 2:
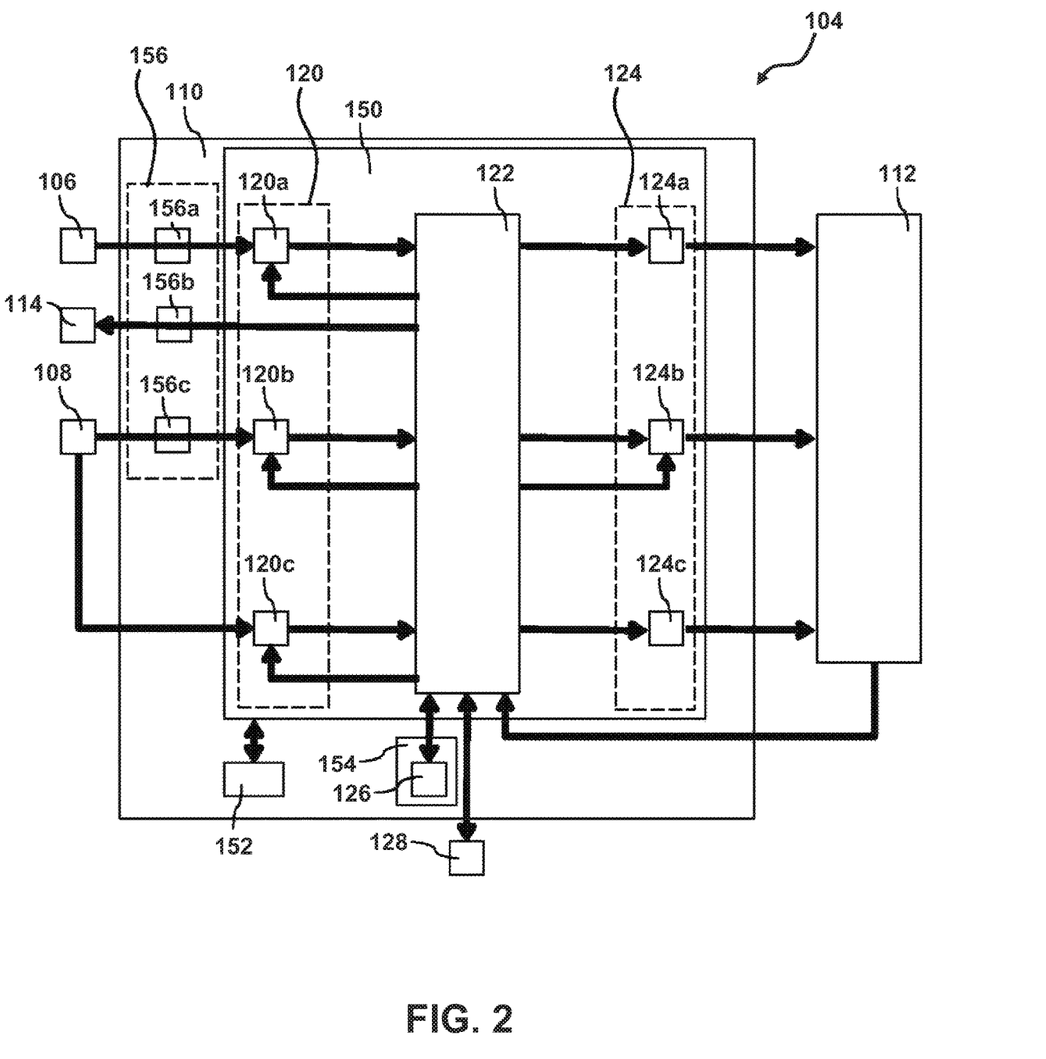
FIG. 2 shows a block diagram of the in-vehicle system with a detailed illustration of one embodiment of the scene estimator.

FIG. 2 shows the in-vehicle system 104 with a detailed illustration of one embodiment of the scene estimator 110.

The scene estimator 110 comprises a processing system 150. The processing system 150 comprises one or more individual processors, controllers, and the like. Particularly, in the illustrated embodiment, processing system 150 comprises a pre-processor assembly 120 having one or more pre-processors 120a, 120b, and 120c, a sensor fusion module 122 in the form of at least one processor, and a post-processor assembly 124 having one or more post-processors 124a, 124b, and 124c. It will be recognized by those of ordinary skill in the art that a "processor" or "controller" includes any hardware system, hardware mechanism or hardware component that processes data, signals or other information. The individual processors 120a, 120b, 120c, 122, 124a, 124b, and 124c of the processing system 150 described herein may be implemented in the form of a single central processing unit, multiple discrete processing units, programmable logic devices, one or more logic gates, ASIC devices, or any other suitable combination of circuitry for achieving the described functionality.

The scene estimator 110 further comprises one or more memories and memories 152 and 154. The one or more individual processors of the processing system 150 are operably connected to the memories 152 and 154. The memories 152 and 154 may be of any type of device capable of storing information accessible by the one or more individual processors of the processing system 150. In at least some embodiments, one or both of the memories 152, 154 are configured to store program instructions that, when executed by the one or more individual processors of the processing system 150, cause the processing system 150 to manipulate data or to operate one or more components in the in-vehicle system 104 or of the vehicle 100 to perform the described tasks or functions attributed to the processing system 150. The stored program instructions may include various sub-modules, sub-routines, and/or subcomponents implementing the features of the individual processors 120a, 120b, 120c, 122, 124a, 124b, and 124c of the processing system 150.

The memories 152, 154 may include non-transitory computer storage media and/or communication media, such as both volatile and nonvolatile, both write-capable and read-only, both removable and non-removable media implemented in any media or technology, including CD-ROM, DVD, optical disk storage, magnetic cassettes, magnetic tape, magnetic disk storage, or other known storage media technology. In one embodiment, the memory 152 is a dynamic memory and the memory 154 is a static memory. The memories 152, 154 may include any number of memories and may be partitioned or otherwise mapped to reflect the boundaries of the various subcomponents.

In some embodiments, the scene estimator 110 further comprises a communication interface assembly 156 having one or more interfaces 156a, 156b, and 156c configured to couple the processing system 150 with the sensors 106, 108 and the actuators 114. The communication interface assembly 156 is configured to enable sensor data, control signals, software, or other information to be transferred between the scene estimator 110 and the sensors 106, 108 or the actuators 114 in the form of signals which may be, for example, electronic, electromagnetic, optical, or other signals capable of being received or transmitted by the communication interface assembly 156. In some embodiments, the communication interface assembly 156 may include physical terminals for connecting to wired media such as a wired network or direct-wired communication (e.g., the communication busses 116). In some embodiments, the communication interface assembly 156 may include one or more modems, bus controllers, or the like configured to enable communications with the sensors 106, 108 or the actuators 114. In some embodiments, the communication interface assembly 156 may include one or more wireless transceivers configured to enable wireless communication such as acoustic, RF, infrared (IR) and other wireless communication methods.

Pre-Processing in the Scene Estimator

As discussed above, in the illustrated embodiment, the processing system 150 includes three pre-processors 120a, 120b, and 120c which are connected to the sensors 106, 108 via the interfaces 156a, 156b, and 156c of the communication interface assembly 156. In the illustrated embodiment, the pre-processor 120a is configured to receive sensor signals from the sensor 106 and the pre-processors 120b and 120c are configured to receive sensor signals from the sensor 108. In some embodiments, each pre-processor 120a, 120b, 120c is further configured to receive feedback or supplementary signals from the sensor fusion module 122. The sensor signals from the sensors 106, 108 and the feedback or supplementary signals from the sensor fusion module 122 may be audio signals, digital signals, video signals, measurement signals, or any suitable signals.

It will be appreciated that, more or fewer than three pre-processors may be included in the processing system 150 depending on the number of sensors 106, 108 and how many different types of pre-processing is to be performed on each respective sensor signal received from the sensors 106, 108. Moreover, for some sensors, pre-processing is unnecessary and no pre-processing is performed by any pre-processor (i.e., the sensor may be connected directly to the sensor fusion module 122).

Each of pre-processors 120a, 120b, and 120c is configured to receive an individual sensor signal from one of the sensors 106, 108 and to extract information from the respective sensor signal to determine an attribute of the interior of the cabin 102. More particularly, in at least some embodiments, each of pre-processors 120a, 120b, and 120c is configured to extract information from the respective sensor signal to determine a chronological sequence of values for an attribute of the interior of the cabin 102. This chronological sequence of values for an attribute is referred herein as a "stream of attributes." In at least one embodiment, the individual values in the stream of attributes are associated with a corresponding timestamp. In at least one embodiment, the individual values in the stream of attributes comprise individual data records describing the attribute at the corresponding timestamp. It will be appreciated, that the structure of the data records, as well their content, is generally different for each type of attribute represented. The streams of attributes may have a fixed update rate (e.g., the pre-processor is configured to send a new data record every second or other predetermined update frequency) or may be updated non-regularly (e.g. the pre-processor is configured to send a new data record only in response to a difference in the output with respect to a previous value reaching a certain threshold difference).

The data records of the streams of attributes determined by each the pre-processors 120a, 120b, and 120c may include number values, text strings, emojis (e.g., still or dynamic), classifications, and the like. In one example, one of the pre-processors 120a, 120b, and 120c may be configured to receive carbon dioxide ($CO_2$) air concentration signal from one of the sensors 106, 108 indicating a $CO_2$ concentration in the air (e.g. inside the cabin 102 or outside the vehicle 100) and generate a stream of quality classifications the of $CO_2$ concentration (e.g., bad, okay, and good classes) based on the $CO_2$ air concentration signal. In another example, one of the pre-processors 120a, 120b, and 120c may be configured to receive a video signal from one of the sensors 106, 108 and generate a further video signal in which lighting artifacts are removed, such as strong sunlight or shadows.

The pre-processors 120a, 120b, and 120c may be configured to perform a variety of different pre-processing operations to in order to ultimately determine the stream of attributes. In some embodiments, one or more of the pre-processors 120a, 120b, and 120c may be configured to sample a received sensor signal at predetermined sample rate. In some embodiments, one or more of the pre-processors 120a, 120b, and 120c may be configured to filter a received sensor signal with a predetermined filter function. In some embodiments, one or more of the pre-processors 120a, 120b, and 120c may be configured to scale or amplify a received signal. As an example, a pre-processor may be configured to receive a video signal from a video camera sensor and remove lighting artifacts. Thus an output signal of the pre-processor would take the form of one or more video image frames having sunlight and/or shadows removed.

In some embodiments, one or more of the pre-processors 120a, 120b, and 120c are configured to determine a stream of attributes by classifying the received sensor signal into one or more classifications from a predetermined set of possible classes for the particular attribute. In one embodiment, a pre-processor may be configured to classify a sensor signal by comparing the sensor signal with one or more predetermined thresholds and/or predetermined ranges corresponding each possible class for the particular attribute. As an example, a pre-processor may be configured to determine a volatile organic compound (VOC) concentration attribute by comparing an VOC concentration signal from a VOC concentration sensor with predetermined thresholds to classify VOC concentration attribute as being either "low," or "high."

In another embodiment, a pre-processor may be configured to classify a sensor signal by using a neural network, such as a deep convolutional neural network based classifier that is trained to output a classification of a particular attribute using the sensor signal as an input. In some embodiments, a pre-processor may be configured to determine a probability and/or confidence value for each class in the predetermined set of possible classes for the particular attribute.

In some embodiments, one or more of the pre-processors 120a, 120b, and 120c are configured to determine a stream of attributes by extracting certain features from the sensor signal. For example, in the case of a video signal from a video camera, a pre-processor may be configured to detect edges of object and/or persons in the video signal.

In some embodiments, one or more of the pre-processors 120a, 120b, and 120c are configured to determine an attribute based on a combination of the respective sensor signal received from one of the sensors 106, 108 and information extracted from feedback or supplementary signals from the sensor fusion module 122.

Sensor Fusion in the Scene Estimator

A sensor fusion module 122 is configured to receive a plurality of streams of attributes from the pre-processors 120a, 120b, and 120c. In some embodiments, the sensor fusion module 122 is configured to receive additional feedback or supplementary signals and/or data from the virtual assistant 112. The sensor fusion module 122 is configured to, based on the streams of attributes provided by one or more of the pre-processors 120a, 120b, and 120c, generate one or more additional streams of attributes relating to the interior of the cabin 102. The sensor fusion module 122 may be configured to determine the one or more additional streams of attributes of the interior of the cabin 102 using a variety of different methods which combine information from multiple of the sensors 106, 108.

The streams of attributes generated by the sensor fusion module 122 are essentially similar to the streams of attributes generated by the pre-processors 120a, 120b, and 120c. The streams of attributes generated by the sensor fusion module 122 can be seen as one or more complex "virtual" sensors for the interior of the cabin 102, which provide indications of more complex or more abstract attributes of the interior of the cabin 102 that are not directly measured or measurable with an individual conventional sensor. The additional streams of attributes output by the sensor fusion module 122 may have a fixed update rate (e.g., the sensor fusion module 122 is configured to send a new data record every second or other predetermined update frequency) or may be updated non-regularly (e.g. the sensor fusion module 122 is configured to send a new data record only in response to a difference in the output with respect to a previous value reaching a certain threshold difference).

In some embodiments, the sensor fusion module 122 is configured to use a deterministic algorithm to generate an additional stream of attributes, such as a decision table, decision tree, or the like that defines the additional attribute depending on the values of two or more of the streams of attributes received from the pre-processors 120a, 120b, and 120c. A detailed example of a decision table is discussed later herein with respect to FIG. 3.

In some embodiments, the sensor fusion module 122 is configured to use a probabilistic model to generate an additional stream of attributes, such as model that defines the additional attribute depending on a predetermined probability distribution and on values of two or more of the streams of attributes received from the pre-processors 120a, 120b, and 120c.

In some embodiments, the sensor fusion module 122 is configured to use a neural network to generate an additional streams of attributes, such as a deep convolutional neural network based classifier that takes as inputs values of two or more of the streams of attributes received from the pre-processors 120a, 120b, and 120c.

In one embodiment, the sensor fusion module 122 is configured to generate one or more additional streams of attributes based a combination of the streams of attributes received from the pre-processing assembly 120 and based also upon additional feedback or supplementary signals and/or data received from the virtual assistant 112.

Post-Processing in the Scene Estimator

With continued reference to FIG. 2, the streams of attributes output by the sensor fusion module 122 are provided to the post-processing assembly 124. In the illustrated embodiment, the post-processing assembly 124 includes three post-processors 124a, 124b, and 124c, which are operably connected to the sensor fusion module 122 and configured to receive the streams of attributes output by the sensor fusion module 122. The post-processors 124a, 124b, and 124c may be configured to perform a variety of different post-processing operations on the streams of attributes received from the sensor fusion module 122.

It will be appreciated that, more or fewer than three post-processors may be included in the processing system 150 depending on the number of outputs provided by the sensor fusion module 122 and how many different types of post-processing is to be performed on each respective output of the sensor fusion module 122. Moreover, for some outputs of the sensor fusion module 122, post-processing is unnecessary and no post-processing is performed by any post-processor (i.e., the output of the sensor fusion module 122 may be connected directly to the virtual assistant 112). The streams of attributes output by the post-processors 124a, 124b, and 124c may have a fixed update rate (e.g., the post-processor is configured to send a new data record every second or other predetermined update frequency) or may be updated non-regularly (e.g. the post-processor is configured to send a new data record only in response to a difference in the output with respect to a previous value reaching a certain threshold difference).

In at least one embodiment, one or more of the post-processors 124a, 124b, and 124c is configured to receive a stream of attributes from the sensor fusion module 122 and to filter the values in the stream of attributes with a filter, such as a sliding average filter, a low pass filter, a high pass filter, a band pass filter. In one example, a post-processor may be configured to filter stream of attributes so as to smooth the values of the attribute or to remove noise or outlier values from the stream of attributes.

In at least one embodiment, one or more of the post-processors 124a, 124b, and 124c is configured to scale, normalize, or amplify the values in the stream of attributes. In one example, in the case that the stream of attributes comprises confidence values for a set of possible classes for the attribute, the post-processor may scale or normalize the confidence values such that the sum of the confidence values for all the possible classes is equal to one (such that the confidence values are probabilities for each of the possible classes). In another example, the post-processor may select the class having the highest confidence value as the output or, alternatively, set the highest confidence value to 100%, while setting the other confidence values to 0%.

In another embodiment, one or more of the post-processors 124a, 124b, and 124c is configured to receive two different streams of attributes from the sensor fusion module 122 and to group, pair, combine, or otherwise associate the values in the stream of attributes. As one example, a post-processor may be configured to correlate values of one stream of attributes with values of another stream of attributes having the a similar or equal timestamp, thus grouping attributes based on the point in time that is represented.

In another embodiment, one or more of the post-processors 124a, 124b, and 124c is configured to receive a stream of attributes from the sensor fusion module 122 and to re-sample the values in the stream of attributes. For example, the stream of attributes provided by the sensor fusion module 122 may have a very high resolution and/or sample rate. A post-processor may be configured to re-sample the stream of attributes with a lower resolution or a lower sample rate, or visa versa. As another example, the stream of attributes provided by the sensor fusion module 122 may have a highly variable update rate. A post-processor may be configured to re-sample the stream of attributes with a fixed update rate using interpolation techniques.

In at least one embodiment, the post-processing assembly 124 includes at least one post-processor configured to compare the values of the reference scene estimation(s) A (which may be stored in one of the memories 152, 154 or another memory not shown) with the values of the scene estimation B (i.e., the current streams of attributes provided by the other post-processors) to determine changes in one or more attributes of the interior of the cabin 102. Particularly, at least one post-processor of the post-processing assembly 124 is configured to determine a difference between values of the reference scene estimation(s) A and the corresponding values of the scene estimation B. The post-processing assembly 124 is configured output to the virtual assistant 112 a signal or message indicating the changes in the scene of the interior of the cabin 102. In some embodiments, in response to detecting a particular change in an attribute of the interior of the cabin 102, the scene estimator 110 and/or the virtual assistant 112 is configured trigger one or more ameliorative actions. In some alternative embodiments, the sensor fusion module 122, the virtual assistant 112, and/or some other processing device is configured perform the comparison of the values of the reference scene estimation(s) A with the values of the scene estimation B to determine changes in one or more attributes of the interior of the cabin 102.

In one embodiment, the virtual assistant 112 is configured to receive streams of attributes from the post-processing assembly 124, which collectively represent an estimation of the scene inside the interior of the cabin 102. Alternatively, in some embodiments, the virtual assistant 112 only receives signal or message indicating the changes in the scene of the interior of the cabin 102. In some embodiments, the virtual assistant 112 is configured to provide certain feedback or supplementary signals to the sensor fusion module 112. As discussed above, in at least one embodiment, the virtual assistant 112 is configured to triggers one or more actions based on the received streams of attributes from the scene estimator 110, which may include operating one or more actuators 114.

Exemplary Scene Estimation Processes

In order to provide a better understanding of the scene estimator 110, exemplary scene estimation processes are described below for determining additional outputs based on two or more sensor signals. However, it will be appreciated, that the examples discussed below are merely for explanatory purposes to illustrate the breadth of possible sensor fusion operations that can be performed by the scene estimator and should not be interpreted as to limit the functionality of the scene estimator 110.

Figure 3:
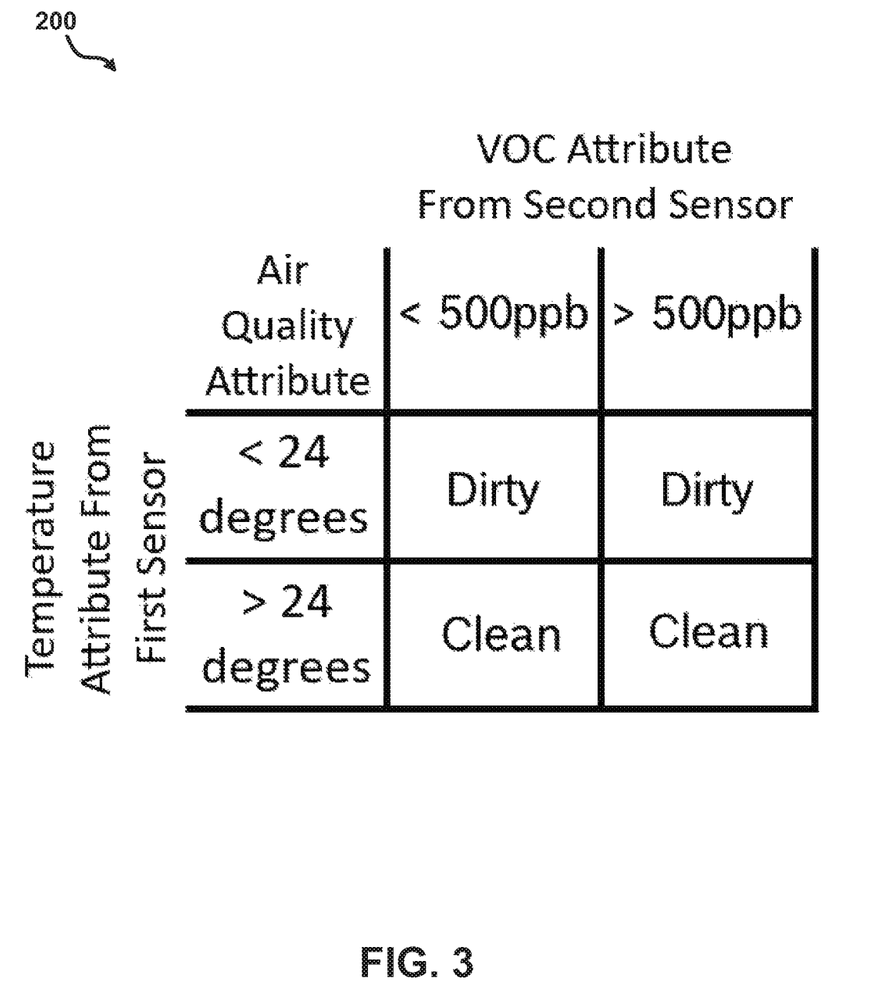
FIG. 3 shows a simplified exemplary decision table used in a sensor fusion process for determining an air quality attribute of a passenger in the cabin.

As a first example, in one embodiment, the scene estimator 110 is configured to determine an air quality attribute of the cabin 102 of the vehicle 100 using a deterministic algorithm. FIG. 3 shows a simplified exemplary decision table 200 used in a scene estimation process for determining an air quality attribute of the cabin 102. In the example, the scene estimator 110 receives a temperature signal from a first sensor (e.g., a thermometer installed within the cabin 102) and a VOC concentration signal from a second sensor (e.g., from VOC concentration sensor installed within the cabin 102). Corresponding pre-processors in the pre-processor assembly 120 generate streams of attributes based on the temperature signal and the VOC concentration signal. Particularly, a first pre-processor generates a stream of attributes in which the temperature attribute is classified as "low" (e.g., <24 degrees) or "high" (e.g., >24 degrees). A second pre-processor generates a stream of attributes in which the VOC concentration attribute is similarly classified as "low" (e.g., <500 ppb) or "high" (e.g., >500 ppb). The sensor fusion module 122 is configured to determine an air quality attribute with reference the decision table 200 and the classified temperature and VOC concentration attributes provided from the pre-processors. Particularly, the sensor fusion module 122 is configured to determine that the air quality is "Dirty" in response to the temperature being "low" and the VOC concentration being "low." The sensor fusion module 122 is further configured to determine that the air quality is "Clean" in response to the temperature being "high" and the VOC concentration being "low." The sensor fusion module 122 is further configured to determine that the air quality is "Dirty" in response to the temperature being "low" and the VOC concentration being "high." Finally, the sensor fusion module 122 is further configured to determine that the air quality is "Clean" in response to the temperature being "high" and the VOC concentration being "high." The sensor fusion module 122 is configured to output a stream of attributes indicating the determined air quality.

Figure 4:
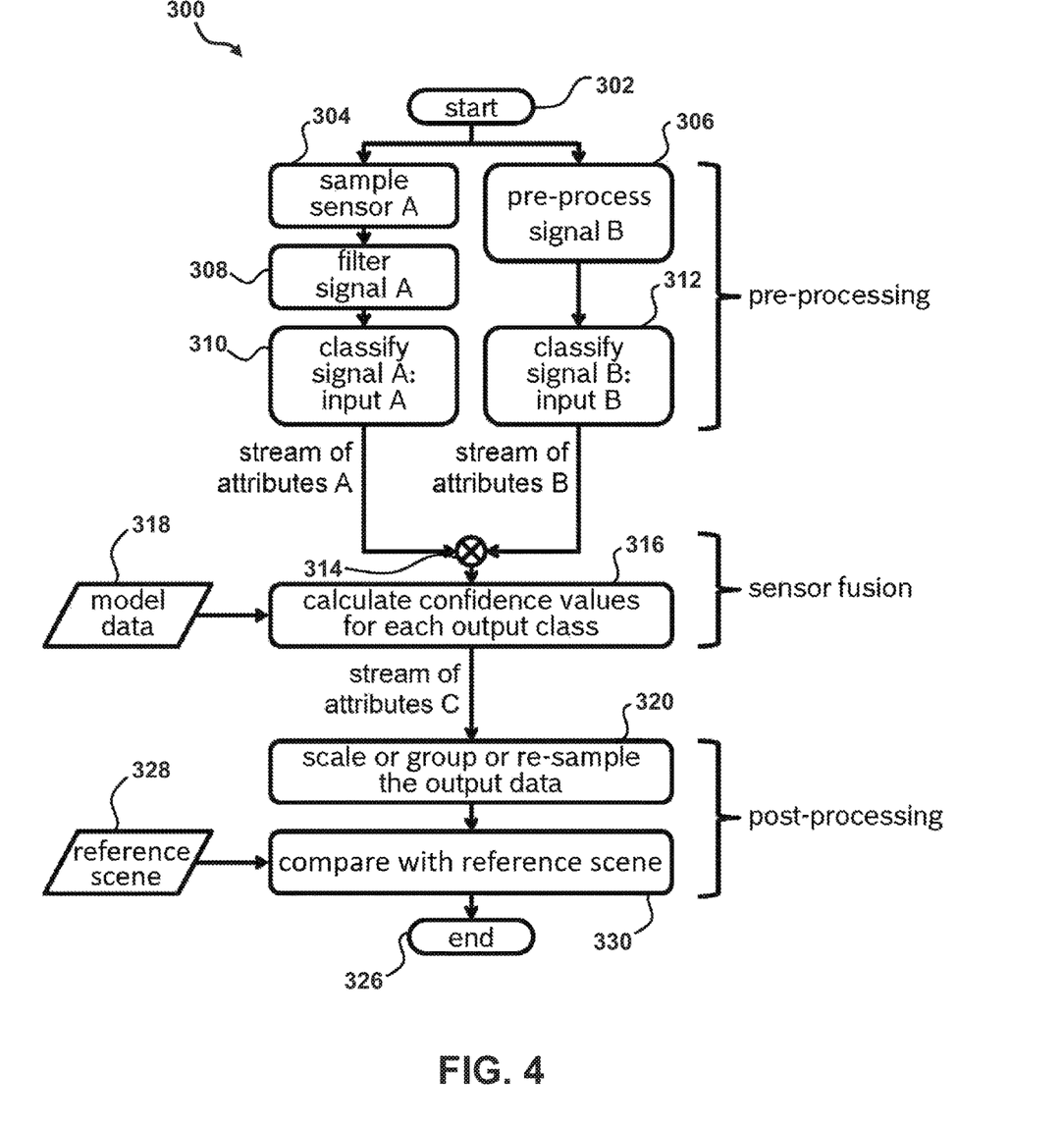
FIG. 4 shows a flow diagram for an exemplary sensor fusion process for determining a cleanliness attribute of the cabin of the vehicle.

As second example, in one embodiment, the scene estimator 110 is configured to determine a cleanliness attribute of the cabin 102 of the vehicle 100 using a probabilistic and/or machine learning model. FIG. 4 shows a flow diagram for an exemplary scene estimation process 300 for determining a cleanliness attribute of the cabin 102 of the vehicle 100. In the example, the in-vehicle system 104 includes sensors A and B which provide sensor signals to the scene estimator (block 302). The sensor A is an air quality sensor configured to determine concentrations of one or more particular chemical compounds in the air of the cabin 102 and to provide at least one analog air quality signal to the scene estimator 110. The sensor B is a video camera configured to record video of the interior of the cabin 102 and to provide a digital video signal to the scene estimator 110.

A first pre-processor of the pre-processing assembly 120 is configured to sample the air quality signal received from sensor A (block 304) to convert the signal into a digital air quality signal. Optionally, the first pre-processor of the pre-processing assembly 120 is further configured to apply a digital filter to remove unwanted noise from the digital air quality signal (block 308). Finally, the first pre-processor of the pre-processing assembly 120 is further configured classify the chemical compounds in the air of the cabin 102 into one or more classes, based on the digital air quality signal (block 310). The possible classifications for the chemical compounds in the air of the cabin 102 may, for example, comprise: volatile organic compounds (VOC), carbon dioxide ($CO_2$), carbon monoxide (CO), large particles (PM10) (e.g., pollen), and small particles (PM2.5) (e.g., dust). Thus, an exemplary output may take a form such as: VOC: ~500 ppb, $CO_2$: ~100 ppb, CO: ~0 ppb, PM10: 100 ppb, PM2.5: 200 ppb. A stream of attributes A representing the classifications of for the chemical compounds in the air of the cabin 102 are provided to the sensor fusion module 122.

A second pre-processor of the pre-processing assembly 120 is configured to receive the digital video signal from the sensor B and remove lighting artifacts from the frames of the video signal, such as strong sunlight or shadows (block 306). The second pre-processor of the pre-processing assembly 120 is further configured to classify the features of the video based on the digital video signal (block 312). The possible features that may be classified include, for example, comprise frames, resolution, or presence of artifacts. Thus, an exemplary output may take a form such as: as video image frames: 20 frames, sunlight and shadows removed. A stream of attributes B representing the classifications of the features of the video are provided to the sensor fusion module 122.

The sensor fusion module 122 is configured to receive the stream of attributes A representing the classifications of the chemical compounds in the air of the cabin 102 and the stream of attributes B representing the classifications of the features of the video. In one embodiment, the stream of attributes A and the stream of attributes B are combined (block 314). The sensor fusion module 122 is configured to use least one model having model parameters and/or model data 318 to determine a stream of attributes that classify the cleanliness attribute of the cabin 102 (block 316) based on the chemical compounds in the air of the cabin 102 (the stream of attributes A) and the features of the video (the stream of attributes B). The possible classifications for the cleanliness of the cabin 102 may, for example, comprise dirty, clean, stain on seat detected, food detected, or smoke smell detected. The sensor fusion module 122 calculates probabilities and/or confidence values for at least some of possible classification of the cleanliness of the cabin 102. Thus, an exemplary output may take a form such as: dirty: 80%, stain on seat, Food detected: 90%.

A stream of attributes C representing the classifications of the cleanliness of the cabin 102 are provided to the post-processing assembly 124 and/or the virtual assistant 112. Finally, at least one post-processor of the post-processing assembly 124 is configured to perform one or more post-processing operations, such as scaling, grouping, and re-sampling (block 320) on the output of the sensor fusion module 122 (the stream of attributes C). For example, a post-processor of the post-processing assembly 124 may be configured to simplify the stream of attributes C by simply outputting the class having a highest confidence value. As another example, a post-processor of the post-processing assembly 124 may be configured to filter the stream of attributes C so as to eliminate noise and/or outliers (e.g., a stream comprising mostly clean classifications may have a random outlier such as a single dirty classification, which can be filtered out).

After any necessary post-processing, an additional post-processor of the post-processing assembly 124, sensor fusion module 122, and/or the virtual assistant 112 is configured to compare (block 330) the values of at least one reference scene estimation 328 with the values of the current scene estimation (i.e., the current values for at least the stream of attributes C) to determine changes in the cleanliness of the interior of the cabin 102. The post-processing assembly 124 is configured output to the virtual assistant 112 a signal or message indicating the changes in the cleanliness of the interior of the cabin 102. Finally, the process 300 is ended (block 326).

Knowledge Database

Returning to FIG. 2, in at least one embodiment, the scene estimator 110 utilizes one or more knowledge databases 126, 128. In one embodiment, the knowledge database 126 is stored locally in the memory 154 and the knowledge database 128 is stored remotely, such as on an external server. In at least one embodiment, the remote knowledge database 128 is common to multiple vehicles and/or multiple in-vehicle systems, whereas the local knowledge database 126 may incorporate a combination of data that is common to multiple vehicles and data that is unique to the particular vehicle 100. In some embodiments, the local knowledge database 126 omitted and all of the necessary data is stored remotely in the remote knowledge database 128.

In one embodiment, the remote knowledge database 128 has a structure configured to support clustering of knowledge based on vehicle type or vehicle configuration. In one embodiment, the local knowledge database 126 and/or the remote knowledge database 128 is configured to store information related to the vehicle in the current condition (e.g. cabin configuration, typical usage patterns, typical wearing patterns, typical seating for passengers, etc.). In one embodiment, the local knowledge database 126 and/or the remote knowledge database 128 is configured to store information related to individual passengers of a vessel (e.g. social media profiles, applied behavior in previous rides in similar vessels, etc.).

As discussed above, the sensor fusion module 122 may be configured to use a variety of different models for determining additional streams of attributes based on the streams of attributes received from the pre-processing assembly 120. Particularly, in some embodiments, the sensor fusion module 122 may utilize deterministic, probabilistic, and/or machine learning techniques. The local knowledge database 126 and/or the remote knowledge database 128 is configured to store model parameters and/or model data that are used to determine the additional streams of attributes (shown as model data 318 in FIG. 4). In the case of deterministic or probabilistic techniques, the sensor fusion module 122 is configured to determine the additional streams of attributes with reference to one or more predetermined threshold parameters, equation parameters, distribution functions, and the like, the values and details of which may be stored in the local knowledge database 126 and/or the remote knowledge database 128. Likewise, in the case of machine learning techniques, the sensor fusion module 122 is configured to determine the additional streams of attributes using an artificial neural network with reference to trained model parameters, weights, kernels, etc., the values and details of which may be stored in the local knowledge database 126 and/or the remote knowledge database 128.

In some embodiments, the local knowledge database 126 and/or the remote knowledge database 128 may be configured to store similar model parameters and/or model data that are used by the pre-processors of the pre-processing assembly 120 and/or the post-processors of the post-processing assembly 124. However, in the illustrated embodiment, such model parameters and/or model data is stored on different memories associated with the pre-processing assembly 120 or post-processing assembly 124.

In some embodiments, the sensor fusion module 122 is configured to store one or more of the determined streams of attributes in the local knowledge database 126 and/or the remote knowledge database 128. In some embodiments, the sensor fusion module 122 is configured to later retrieve the stored streams of attributes and determine further streams of attributes based thereon. In the case that streams of attributes are stored the remote knowledge database 128, in some embodiments, the sensor fusion module 122 is configured to retrieve streams of attributes that were stored by a sensor fusion module of another in-vehicle system of another vehicle, which can be used to determine further streams of attributes based.

In some embodiments, the sensor fusion module 122 may obtain or receive information from the virtual assistant 112 via the communication buses 116 in order to extend the knowledge database(s) 126, 128 or to tune the scene estimation (discussed below). In one embodiment, the virtual assistant 112 may provide information about the environment or expected interior status. The sensor fusion module 122 is configured to use the information provided by the virtual assistant 112 to improve the condition of the cabin via tuning the scene estimation. In another embodiment, the virtual assistant 112 may provide information that the sensor fusion module could use to extend the knowledge with a stakeholder, for instance. For example, the sensor fusion module 122 estimates a cleanliness status and the virtual assistant 112 adds to the status of the cleanliness a rating from the user. The human perceived cleanliness status along with the sensor fusion input may be added to the knowledge database(s) 126, 128 and used by the sensor fusion module 122 to determine the additional streams of attributes.

Training

Figure 5:
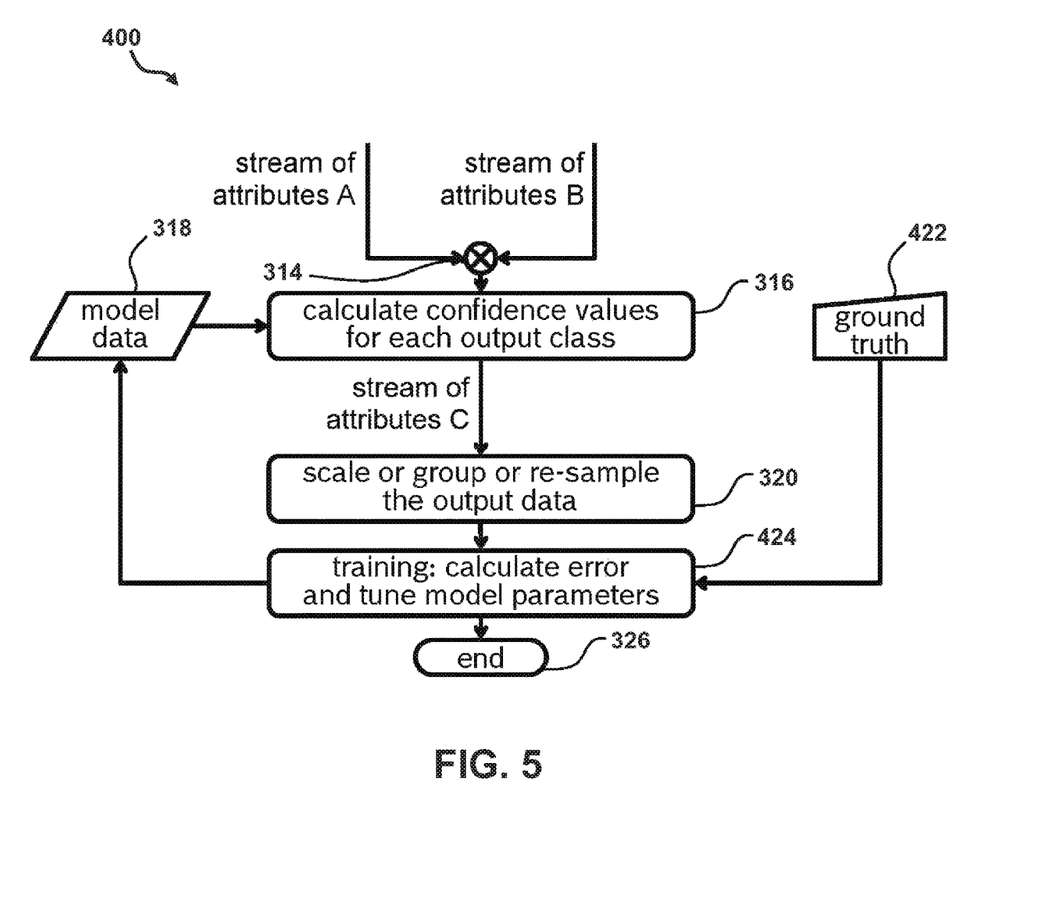
FIG. 5 shows a flow diagram for an exemplary training process for tuning model parameters used by the sensor fusion module to determine streams of attributes.

FIG. 5 shows an exemplary training process 400 for tuning model parameters used by the sensor fusion module 122 to determine streams of attributes. Particularly, as discussed above, the local knowledge database 126 and/or the remote knowledge database 128 is configured to store model parameters and/or model data that are used by the sensor fusion module 122 to determine the additional streams of attributes. In some embodiments, the model parameters, thresholds, etc. are adjusted and/or tuned using additional training data (ground truth 422).

As similarly discussed above, with respect to the example of FIG. 4, the sensor fusion module 122 is configured to receive streams of attributes A and B from the pre-processing assembly 120 (blocks 314 and 316). The sensor fusion module 122 is configured to use at least one model having model parameters and/or model data 318 to generate an additional stream of attributes C, which comprises confidence values for each possible classification of the attribute C. Next, at least one post-processor of the post-processing assembly 124 is configured to perform one or more post-processing operations, such as scaling, grouping, and re-sampling on the stream of attributes C, which was generated by the sensor fusion module 122, as discussed above.

In the exemplary training process 300, the output of the post-processing assembly 124 of the scene estimator 110 is compared with ground truth 422 to determine an error (block 424). The calculated error is used to adjust values of the model parameters and/or model data 318 that are used by the sensor fusion module 122 to determine the additional streams of attributes. In one embodiment, a processor of the processing assembly 150, such as a post-processor of the post-processing assembly 124, is configured to calculate the error is and to adjust the values of the model parameters and/or model data. However, any processor or processing system can be used to perform the training and adjustment of the model parameters and/or model data 318. In the case that the sensor fusion module 122 utilizes machine learning techniques to determine the additional streams of attributes, one or more loss functions can be used to train the model parameters, weights, kernels, etc.

The ground truth 422 generally comprises labeled data that is considered to be the correct output for the scene estimator 110, and will generally take a form that is essentially similar to estimated output from the scene estimator 110 (e.g., the stream of attributes C after post-processing). In some embodiments, a human observer manually generates the ground truth 422 that is compared with the estimated output from the scene estimator 110 by observing the scene in the interior of the cabin 102. However, depending on the nature of the attributes of the cabin 102 that are being estimated by the scene estimator 110, the ground truth can be derived in various other manners.

In one embodiment, the virtual assistant 112 is communicatively coupled to more than one information sources may request ground truth information relevant to a specific scene. The information may include past, future, or predictive information. For example, the virtual assistant 112 may receive information regarding typical air quality readings, at specific temperatures and humidity. As another example, the virtual assistant 112 may receive information that is published by the passenger or the stakeholder providing public services including rental, public transportation, and so forth. The information published by a stakeholder may include a service, a product, an offer, an advertisement, a respond to a feedback, or the like. The content of the information published by a passenger may include a complaint, a comment, a suggestion, a compliment, a feedback, a blog, or the like. Particularly, the passenger might publish information about the frustration he had during his last ride in a car and the virtual assistant 112 is configured to map this post to a specific ride of that passenger. Similarly, the passenger might give feedback indicating that they have spilt something or otherwise caused the interior of the cabin to become dirty. In one embodiment, before regular cleaning or maintenance, the status of the interior might be rated.

The training data is then stored either in a local knowledge database 126, the remote knowledge database 128, or combination thereof. In some embodiments, the training data stored in the local knowledge database 126 is specific and/or unique to the particular vehicle 100. In some embodiments, training data stored in the remote knowledge database 128 is applicable to multiple vehicles. In some embodiments, the training data may be forwarded to, exchanged between, or share with other vehicles. In another embodiment, the training data may be broadcasted to other vehicles directly or indirectly.

In some embodiments, some portions of the training process for the sensor fusion module 122 can be performed locally, while other portions of the training process for the sensor fusion module 122 are performed remotely. After remote training the updated model data can be deployed to the scene estimator units in the vehicles.

It will be appreciated that training processes similar to those described above can be applied to the pre-processors of the pre-processing assembly 120 and the post-processors of the post-processing assembly 124. Particularly, as discussed above, at least the pre-processors of the pre-processing assembly 120 may use models that incorporate various predetermined thresholds, predetermined ranges, and/or trained neural networks to determine streams of attributes that are provided to the sensor fusion module 122. These parameters can be adjusted or tuned based on training data and/or ground truth, in the same manner as discussed above (e.g., the thresholds used to distinguish between "low" and "high" classifications for temperature or VOC concentration can be adjusted). However, in at least some embodiments, the processes performed by the pre-processing assembly 120 and/or the post-processing assembly 124 are broadly applicable operations that are not specific to the particular environment of the vehicle (e.g., filtering, edge detection, facial recognition). Accordingly, the operations of the pre-processing assembly 120 and/or the post-processing assembly 124 are generally trained in some other environment using a robust set of broadly applicable training data.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A system for monitoring a scene in an interior of a cabin of a vehicle, the system comprising:
    a plurality of sensors, each sensor in the plurality of sensors configured to output a respective sensor signal, at least one sensor in the plurality of sensors being configured measure an aspect of the interior of the cabin; and
    a processing system operably connected to the plurality of sensors and having at least one processor, the processing system configured to:
        receive each respective sensor signal from the plurality of sensors;
        determine, during a first time period, (i) a reference value for a first attribute of the interior of the cabin based on a first sensor signal from a first sensor in the plurality of sensors, (ii) a reference value for a second attribute of the interior of the cabin based on a second sensor signal from a second sensor in the plurality of sensors, and (iii) a reference value for a third attribute of the interior of the cabin based on the reference value for the first attribute and the reference value for the second attribute;
        determine, during a second time period that is subsequent to the first time period, (i) a current value for the first attribute of the interior of the cabin based on the first sensor signal from the first sensor in the plurality of sensors, (ii) a current value for the second attribute of the interior of the cabin based on the second sensor signal from the second sensor in the plurality of sensors, and (iii) a current value for the third attribute of the interior of the cabin based on the current value for the first attribute and the current value for the second attribute; and
        determine a change in the interior of the cabin by comparing the current value for the third attribute with the reference value for the third attribute.

2. The system according to claim 1 further comprising:
    at least one memory operably connected to the processing system,
    wherein the processing system is configured to:
        store at least the reference value for the third attribute in the at least one memory.

3. The system according to claim 1 further comprising:
    an actuator operably connected to the processing system and configured to adjust an aspect of the interior of the cabin that influences at least one of the first sensor signal and the second sensor signal,
    wherein the processing system is configured to at least one of (i) prior to the first time period and (ii) during the first time period, operate the actuator to be in a predetermined state.

4. The system according to claim 3, the processing system configured to:
    at least one of (i) between first time period and the second time period and (ii) during the second time period, operate the actuator to be in the predetermined state.

5. The system according to claim 1, the processing system configured to:
    determine the reference value and the current value of the first attribute by classifying the first sensor signal as at least one class from a predetermined set of classes for the first attribute.

6. The system according to claim 5, the processing system configured to:
    classify the first sensor signal as at least one class from the predetermined set of classes for the first attribute by comparing the first sensor signal with at least one of (i) a first threshold value and (ii) a first range of values.

7. The system according to claim 5, the processing system configured to:
classify the first sensor signal as at least one class from the predetermined set of classes for the first attribute using a neural network.

8. The system according to claim 5, the processing system configured to:
determine the reference value and the current value of the first attribute by determining at least one of (i) probability and (ii) a confidence value for each class in the predetermined set of classes for the first attribute based on the first sensor signal.

9. The system according to claim 1, the processing system configured to:
determine the reference value and the current value of the first attribute by extracting features from the first sensor signal using a neural network.

10. The system according to claim 1, the processing system configured to:
determine the reference value and the current value of the first attribute by at least one of sampling, filtering, and scaling the first sensor signal.

11. The system according to claim 1, the processing system configured to:
determine the reference value and the current value of the third attribute with reference to a logic table that defines a value for the third attribute based on a value of the first attribute and a value of the second attribute.

12. The system according to claim 1, the processing system configured to:
determine the reference value and the current value of the third attribute using a neural network that determines values for the third attribute based on values of the first attribute and values of the second attribute.

13. The system according to claim 1, the processing system configured to:
determine the reference value and the current value of the third attribute by determining a class value selected from a predetermined set of classes for the third attribute based on values of the first attribute and values of the second attribute.

14. The system according to claim 10, the processing system configured to:
determine at least one of (i) the probability and (ii) a confidence value for each class in the predetermined set of classes for the third attribute based on values of the first attribute and values of the second attribute.

15. The system according to claim 11, the processing system configured to:
determine the reference value and the current value of the third attribute by selecting a class from the predetermined set of classes for the third attribute having at least one of (i) a highest probability and (ii) a highest confidence value.

16. The system according to claim 1, the processing system configured to:
process the reference value and the current value of the third attribute by at least one of re-sampling, filtering, and scaling the reference value and the current value of the third attribute, respectively.

17. The system according to claim 1, wherein:
the first sensor is a temperature sensor and the first attribute is a temperature classification of the interior of the cabin;
the second sensor is an air quality sensor configured to detect a chemical compound in the air of the interior of the cabin and the second attribute is a concentration classification for the chemical compound in the air of the interior of the cabin; and
the third attribute is an air quality classification of the interior of the cabin.

18. The system according to claim 1, wherein:
the first sensor is an air quality sensor configured to detect at least one chemical compound in the air of the interior of the cabin and the first attribute is an air quality classification of the interior of the cabin;
the second sensor is a video camera and the second attribute is a feature of a video signal showing the interior of the cabin; and
the third attribute is a cleanliness classification of the interior of the cabin.

19. The system according to claim 1, the processing system configured to:
output the determined change in the interior of the cabin to a computing device that is operably connected to the processing system.

20. A method for monitoring a scene in an interior of a cabin of a vehicle, the method comprising:
receiving, with a processing system, a respective sensor signal from each of a plurality of sensors, the processing system being operably connected to the plurality of sensors and having at least one processor, each sensor in the plurality of sensors being configured to output the respective sensor signal to the processing system, at least one sensor in the plurality of sensors being configured measure an aspect of the interior of the cabin;
determining, with the processing system, during a first time period, (i) a reference value for a first attribute of the interior of the cabin based on a first sensor signal from a first sensor in the plurality of sensors, (ii) a reference value for a second attribute of the interior of the cabin based on a second sensor signal from a second sensor in the plurality of sensors, and (iii) a reference value for a third attribute of the interior of the cabin based on the reference value for the first attribute and the reference value for the second attribute;
determining, with the processing system, during a second time period that is subsequent to the first time period, (i) a current value for the first attribute of the interior of the cabin based on the first sensor signal from the first sensor in the plurality of sensors, (ii) a current value for the second attribute of the interior of the cabin based on the second sensor signal from the second sensor in the plurality of sensors, and (iii) a current value for the third attribute of the interior of the cabin based on the current value for the first attribute and the current value for the second attribute; and
determining, with the processing system, a change in the interior of the cabin by comparing the current value for the third attribute with the reference value for the third attribute.

* * * * *